(12) United States Patent
Shetty

(10) Patent No.: US 6,850,930 B2
(45) Date of Patent: Feb. 1, 2005

(54) METHOD FOR TRANSFORMING WORDS TO UNIQUE NUMERICAL REPRESENTATION

(75) Inventor: Ravindra K. Shetty, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 278 days.

(21) Appl. No.: 09/804,932

(22) Filed: Mar. 13, 2001

(65) Prior Publication Data

US 2003/0023588 A1 Jan. 30, 2003

(51) Int. Cl.⁷ ............................................. G06F 17/30
(52) U.S. Cl. ....................................................... 707/3
(58) Field of Search ........................... 707/3, 4, 5, 6; 713/186; 341/106, 107; 704/4, 7, 9; 706/4, 12, 21

(56) References Cited

U.S. PATENT DOCUMENTS

| | | | |
|---|---|---|---|
| 3,645,015 A | * | 2/1972 | Pfeiffer ........................ 35/14 |
| 5,598,474 A | | 1/1997 | Johnson ....................... 380/23 |
| 5,866,330 A | | 2/1999 | Kinzler et al. ................. 435/6 |
| 5,892,470 A | * | 4/1999 | Kusnick .................... 341/106 |
| 6,502,091 B1 | * | 12/2002 | Chundi et al. ................ 707/3 |

* cited by examiner

Primary Examiner—Safet Metjahic
Assistant Examiner—Etienne P LeRoux
(74) Attorney, Agent, or Firm—Kris T. Fredrick

(57) ABSTRACT

Multiple words in a text are transformed to unique numerical representations for text mining applications. A web server receives the text, including multiple words in a natural language. A key-word extractor extracts one or more key-words from the received words. A morphologizer morphologizes the extracted key-words based on similarities of fundamental characteristics in the extracted key-words. An analyzer transforms each of the morphologized words to a unique numerical representation such that the transformed unique numerical representation does not result in multiple similar numerical representations.

13 Claims, 2 Drawing Sheets

METHOD FOR TRANSFORMING WORDS TO UNIQUE NUMERICAL REPRESENTATION

FIELD OF THE INVENTION

This invention relates generally to the field of intelligent information retrieval, and more particularly pertains to text mining applications.

BACKGROUND

It is generally required to have unique numeric representation of words in any language for efficient processing in text mining applications such as natural language processing. The text form of words in a natural language is not an efficient representation of the words for text mining applications. For example, in a natural language, similarly spelt words can have entirely different meanings. Therefore, it is necessary that each word be mapped to a unique representation to avoid an overlap in the similarly spelt words. Currently, the words are generally mapped to a numerical domain to avoid an overlap in the similarly spelt words and to have unique numeric representations that can provide flexibility and computational efficiency in the text mining applications. Current methods to map the words in a text to unique numeric representations include methods such as ASCII conversion and random number generators. These methods can be very inefficient in mapping text to unique numeric representations, and can still generate overlapping numbers when multiple words are mapped to a numerical domain, which can result in ambiguous prediction of meaning during the text mining applications.

Therefore, there is a need in the art for a technique that can map the words in a text to unique numeric representations that can avoid overlapping of generated numbers, to provide flexibility and computational efficiency in text mining applications.

SUMMARY OF THE INVENTION

The present invention provides a system and a method for transforming multiple words in a text to unique numerical representations for text mining applications. The system and method includes a web server to receive a text including multiple words in a natural language. A key-word extractor extracts one or more key-words from the received words. A morphologizer morphologizes the extracted key-words based on similarities of fundamental characteristics in the extracted key-words. The similarities of fundamental characteristics can be based on underlying/basic meaning of words. In some embodiments, the morphologizing can include clustering of the extracted key-words based on statistical similarity of their contents. An analyzer transforms each of the morphologized words to a unique numerical representation such that the transformed unique numerical representation does not result in multiple similar numerical representations, to avoid ambiguous prediction of meaning of the translated words in the received text.

Other aspects of the invention will be apparent on reading the following detailed description of the invention and viewing the drawings that form a part thereof.

DETAILED DESCRIPTION

This invention offers a technique for transforming multiple words in a text to a unique numerical representation such that the transformed numerical representation does not result in multiple similar (same or exact) numerical representations, to avoid ambiguous prediction of meaning (in the prior-art mapping technique, two or more words having different meaning can result in same numerical representation, which in can in turn result in ambiguous prediction of meaning or improper interpretation of the words of the translated words in the received text. The transformed unique numerical representations can be used to significantly improve the efficiency of text mining applications such as automated email response, automated text mining applications, unique key-word representations, and/ or intelligent communication devices.

Figure 1:
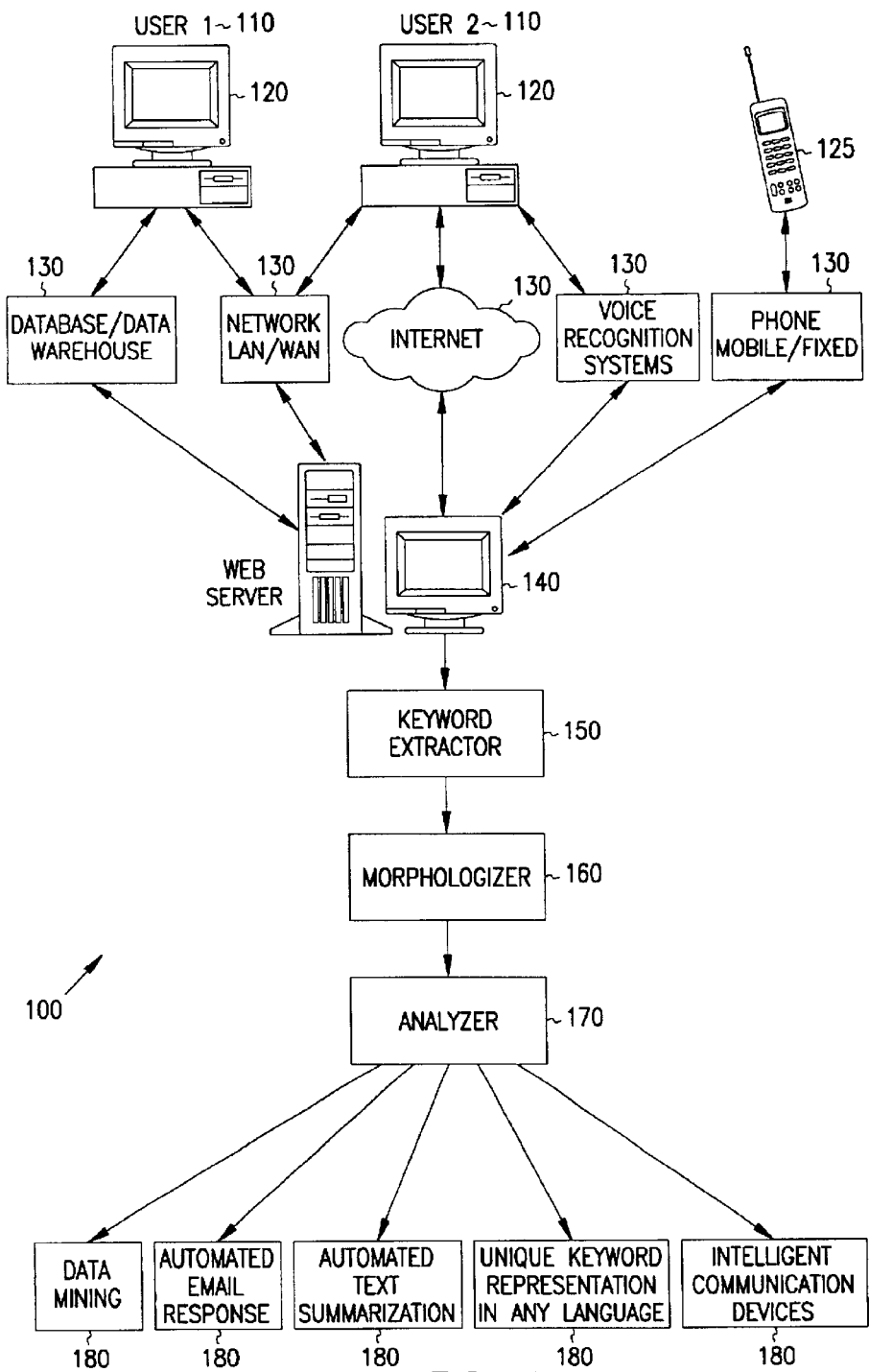
FIG. 1 illustrates an overview of one embodiment of a computer implemented system according to the present invention.

FIG. 1 illustrates an overview of one embodiment of a computer-implemented system 100 according to the present invention. A web server 140 is connected to receive text including multiple words in a natural language from various sources 130. For example, the web server 140 can receive text from sources such as a data base/data warehouse, a LAN/WAN network, Internet, a voice recognition system, and/or mobile/fixed phone. The computer-implemented system 100 allows users and/or visitors 110 to send the text via the various sources 130 via their computers 120.

The computer-implemented system 100 can include a key-word extractor 150. The key-word extractor 150 is connected to the web server 140 and extracts one or more key-words from the received text. In some embodiments, the key-word extractor 150 extracts one or more key-words based on specific criteria, such as for filtering the text to remove all words including three or fewer letters in the received text, or for filtering the text to remove rarely used words.

In some embodiments, a morphologizer 160 is connected to the computer-implemented system 100 to morphologize each of the filtered key-words for base formatting to improve the efficiency of processing the filtered key-words in the computer-implemented system 100. In some embodiments, morphing is based on classifying the extracted key-words based on similarities of fundamental characteristics in the extracted key-words (based on the basis of the extracted key-words). For example, morphing recasts/alters words such a way that the morphed word's pronunciation or their meaning remain in place and adheres to its fundamental meaning. The following table illustrates one embodiment of morpholizing words according to the present invention:

| Example Number | Word(s) in the text | Morphologized Word |
|---|---|---|
| 1 | Police | Polic |
| 2 | Policy | Polici |
| 3 | Worked | Work |
| 4 | Going | Go |
| 5 | Destination | Destin |
| 6 | Personalize | Person |
| 7 | Based | Base |
| 8 | Industrial | Industri |
| 9 | Connect, Connected, Connecting, Connection, Connections | Connect |

An analyzer 170 is connected to the computer-implemented system 100 transforms each of the morphologized words to a unique numerical representation such that the transformed unique numerical representation does not result in multiple similar numerical representations, to avoid ambiguous prediction of meaning of the translated words in the received text. In some embodiments, the analyzer transforms the morphologized words using following A to Z helix transformation function:

$$(W) = \sum_{k=0}^{l} \{(\beta_{l-k})n^{l-k} + (l-k)\}$$

wherein W is a unique number obtained by using the above transformation function for a word having a length of l+1 letters, wherein the letters in the word W can be represented as $\beta_l \, \beta_{(l-1)} \, \beta_{(l-2)} \ldots \beta_0$, and also wherein $\beta_i$ represents the letter in the $i^{th}$ location of the alphabet in a particular language having n distinct letters in the alphabet of the language. For example, in English language, n will be equal to 26.

In some embodiments, the analyzer 170 transforms the key-words to a unique numerical representation using the A to Z helix transformation function.

The following example illustrates the process of transforming a word such as KEYBOARD (this can be a key-word or a morphologized word) using the A to Z helix transformation function.

Table I illustrates the process of representing letters in the word KEYBOARD.

TABLE I

| WORD | K | E | Y | B | O | A | R | D |
|---|---|---|---|---|---|---|---|---|
| | $\beta_l$ | $\beta_{(l-1)}$ | $\beta_{(l-2)}$ | $\beta_{(l-3)}$ | $\beta_{(l-4)}$ | $\beta_{(l-5)}$ | $\beta_{(l-6)}$ | $\beta_0$ |
| | $\beta_7$ | $\beta_6$ | $\beta_5$ | $\beta_4$ | $\beta_3$ | $\beta_2$ | $\beta_1$ | $\beta_0$ |

Table II illustrates the mapping of the represented letters in the natural language to a scale. In this example the word KEYBOARD is in English; therefore letters A to Z are mapped to a scale of 1 to 26 (since there are 26 letters in the English alphabet) for the A to Z helix transformation. The following table compares the mapping techniques employed by the present invention with the mapping technique employed by the prior art methods ASCII 1 and ASCII 2 to further clarify the differences in the mapping techniques.

TABLE II

| Letter | A | B | C | D | E | F | G | H | I | J | K | L | M |
|---|---|---|---|---|---|---|---|---|---|---|---|---|---|
| Alphabet location | 1 | 2 | 3 | 4 | 5 | 6 | 7 | 8 | 9 | 10 | 11 | 12 | 13 |
| Upper Case ASCII | 65 | 66 | 67 | 68 | 69 | 70 | 71 | 72 | 73 | 74 | 75 | 76 | 77 |
| Lower Case ASCII | 97 | 98 | 99 | 100 | 101 | 102 | 103 | 104 | 105 | 106 | 107 | 108 | 109 |

| Letter | N | O | P | Q | R | S | T | U | V | W | X | Y | Z |
|---|---|---|---|---|---|---|---|---|---|---|---|---|---|
| Alphabet location | 14 | 15 | 16 | 17 | 18 | 19 | 20 | 21 | 22 | 23 | 24 | 25 | 26 |
| Upper Case ASCII | 78 | 79 | 80 | 81 | 82 | 83 | 84 | 85 | 86 | 87 | 88 | 89 | 90 |
| Lower Case ASCII | 110 | 111 | 112 | 113 | 114 | 115 | 116 | 117 | 118 | 119 | 120 | 121 | 122 |

Table III illustrates the computation of the word KEYBOARD using the A to Z helix transformation function. The computed "total" generates the unique numerical representation for the word KEYBOARD.

TABLE III

| SL No | Significant Parameters | Letter | Scaling Location (i) | Priority (l) | Place Value |
|---|---|---|---|---|---|
| 1 | Most | K | 11 | 7 | $11 * 26^7 + (7 - 0)$ |
| 2 | Next | E | 5 | 6 | $5 * 26^6 + (7 - 1)$ |
| 3 | | Y | 25 | 5 | $25 * 26^5 + (7 - 2)$ |
| 4 | | B | 2 | 4 | $2 * 26^4 + (7 - 3)$ |
| 5 | | O | 15 | 3 | $15 * 26^3 + (7 - 4)$ |
| 6 | | A | 1 | 2 | $1 * 26^2 + (7 - 5)$ |
| 7 | | R | 18 | 1 | $18 * 26^1 + (7 - 6)$ |
| 8 | Least | D | 4 | 0 | $4 * 26^0 + (7 - 7)$ |
| | | | Total | | $11 * 26^7 + 5 * 26^6 + 25 * 26^5 + 2 * 26^4 +$ |

TABLE III-continued

| SL · Significant No Parameters | Scaling Letter | Priority Location (i) | (l) | Place Value |
|---|---|---|---|---|
| | | | | $15 * 26^3 + 1 * 26^2 + 18 * 26^1 + 4 * 26^0 + (28) =$ 90192703308 |

Table IV illustrates example embodiments of the method of obtaining numerical representation for the word KEYBOARD using the prior art ASCII 1, ASCII 2 and random mapping methods.

TABLE IV

| Letter | Example Embodiment 1 (ASCII 1) | Example Embodiment 2 (ASCII 2) | Example Embodiment 3 (Random Mapping) |
|---|---|---|---|
| K | 75 | 75 | — |
| E | 69 | 69 | — |
| Y | 89 | 89 | — |
| B | 66 | 66 | — |
| O | 79 | 79 | — |
| A | 65 | 65 | — |
| R | 82 | 82 | — |
| D | 68 | 68 | — |
| Total | 7569896679658268 | 593 | Random Number |

The following illustrates by contradiction the unique numerical representation obtained using A to Z helix transformation function is really unique.

Let $\alpha_i$ (i=1, 2, ... n) be letters in a particular language, where n is the number of distinct letters in that language. For example, in English language n=26. Consider one word W of length l+1, which can be represented as $\beta_l \beta_{(l-1)} \beta_{(l-2)} \cdots \beta_0$. where $\beta_i$ represents the letter in the $i^{th}$ location of the alphabet, which is a subset of $\alpha$.

Mathematically any word of length l can be represented as $$W = \left\{ \prod_{k=l}^{0} \beta_k \right\}$$

In the above word W the Most Significant Letter (MSL) and Least Significant Letter (LSL) are $\beta_l$ and $\beta_0$, respectively.

(A to Z)$_w$ helix representation of the word W is represented by $$(W) = \sum_{k=0}^{l} \{(\beta_{l-k})n^{l-k} + (l-k)\}$$

Assuming two distinct words $W_1$ and $W_2$ of length $l_1$ and $l_2$ that have the same representation in the A to Z helix transformation, $W_1$ and $W_2$ are represented in the A to Z helix notation as $$W_1 = \sum_{k=0}^{l_1} \{(\beta_{l_1-k})n^{l_1-k} + (l_1-k)\} \quad (1)$$

$$W_2 = \sum_{k=0}^{l_2} \{(\beta_{l_2-k})n^{l_2-k} + (l_2-k)\}$$

The following illustrates the three possible scenarios for the words $W_1$ and $W_2$:

Scenario 1: $l_1 < l_2$
Scenario 2: $l_1 > l_2$ and
Scenario 3: $l_1 = l_2$

Mathematical Illustration for Scenarios 1 and 2: When $l_1 < l_2$ & $l_1 > l_2$

The A to Z helix representation of word W1 given by equation (1), $$W_1 = \sum_{k=0}^{l_1} \{(\beta_{l_1-k})n^{l_1-k} + (l_1-k)\}, \text{ can be rewritten as}$$

$$W_1 = \{(\beta_{l_1}n^{l_1} + (l_1-0)) + (\beta_{(l_1-1)}n^{l_1-1} + (l_1-1)) + \ldots + (\beta_{(l_1-l_1)}n^{l_1-l_1} + (l_1-l_1))\} = \left\{ \left( l_1(l_1+1) - \sum_{k=0}^{l_1} k \right) + \sum_{k=0}^{l_1} (\beta_{l_1-k})n^{l_1-k} \right\}$$

Consider the maximum value of $W_1$:
$W_1$ is maximum when $\beta_k = n$, $\forall$ k and can be represented by $$(W_1)_{max} = \left\{ \left( l_1(l_1+1) - \sum_{k=0}^{l_1} k \right) + \sum_{k=0}^{l_1} n \cdot n^{l_1-k} \right\}$$

Consider the minimum value of $W_2$, where $W_2$ is a minimum when $\beta_k = 1$ and can be represented by $$(W_2)_{min} = \left\{ \left( l_2(l_2+1) - \sum_{k=0}^{l_2} k \right) + \sum_{k=0}^{l_2} 1 \cdot n^{l_2-k} \right\}$$

But in the beginning it was assumed that $l_1 < l_2 \Rightarrow l_2 \geq (l_1+1)$, $\Rightarrow W_1 \neq W_2$ for $|l_2| > |l_1|$ Mathematical Illustration for Scenario 2: When $l_1 > l_2$
The proof is similar to $l_1 < l_2$
Thus from the above two scenarios
We have
$l_1 < l_2$ and
$l_1 > l_2$
$\Rightarrow l_1 = l_2$
$\Rightarrow$ only scenario 3 i.e. $l_1 = l_2$ holds good in this case.

The above illustration proves that the two words $W_1$ and $W_2$ should at least have the same length to have the same A to Z helix representation. Now the following shows how to prove that the two words $W_1$ and $W_2$ are the same.

Mathematical Illustration for Scenario 3: When $l_1 = l_2$

Let us assume that $W_1$ and $W_2$ differ at ordered positions $r_1 \ r_2 \ldots r_s$ then $$W_1 = \{\beta_l n^{l-0} + (l-0)\} + \{\beta_{(l-1)} n^{l-1} + (l-1)\} + \ldots \{\beta_0 n^{l-l} + (l-l)\} +$$
$$\{\beta_{r1} n^{l-r1} + (l-r_1)\} + \{\beta_{r2} n^{l-r2} + (l-r_2)\} + \ldots + \{\beta_{rs} n^{l-rs} + (l-r_s)\}$$

$$W_2 = \{\beta_l n^{l-0} + (l-0)\} + \{\beta_{(l-1)} n^{l-1} + (l-1)\} + \ldots \{\beta_0 n^{l-l} + (l-l)\} +$$
$$\{\beta_{r1}^1 n^{l-r1} + (l-r_1)\} + \{\beta_{r2}^1 n^{l-r2} + (l-r_2)\} + \ldots + \{\beta_{rs}^1 n^{l-rs} + (l-r_s)\}$$

$$W_1 - W_2 = (\beta_{r1} - \beta_{r1}^1) n^{l-r1} + (\beta_{r2} - \beta_{r2}^1) n^{l-r2} + \ldots + (\beta_{rs} - \beta_{rs}^1) n^{l-rs}$$
$$= (a_1) n^{l-r1} + (a_2) n^{l-r2} + \ldots + (a_s) n^{l-rs}$$

where $a_i = (\beta_{rs} - \beta_{rs}^1)$ for i: 1 to s, which is the relative positional difference of letters in the reference words,
=0 (from our assumption)
The A to Z helix representation ($W_1$)=The A to Z helix representation ($W_2$)

i.e. $(a_1) n^{l-r1} = -(a_2 n^{l-r2} + \ldots + a_s n^{l-rs})$. (2)

In the above equation (2), the minimum value of LHS is given by $$\min((a_1) n^{l-r1}) = n^{l-r1} \text{ (min when } a_1 = 1)$$

In the above equation (2), the maximum value of RHS is given by $$\max\{-(a_2 n^{l-r2} + \ldots + a_s n^{l-rs})\} = \min(a_2 n^{l-r2} + \ldots + a_s n^{l-rs})$$
$$= 1 n^{l-r2} + \ldots + 1 \cdot n^{l-rs} \text{ (min. when } a_2 = a_3 = \ldots = a_s = 1)$$

$\Rightarrow n^{l-r1} > (n^{l-r2} + \ldots + n^{l-rs})$ (From lemma 1)
$\Rightarrow$ min of LHS>max RHS
$\Rightarrow W_1 \neq W_2$
$\Rightarrow \Leftarrow$ This contradicts our assumption that $W_1$ and $W_2$ have the same A to Z helix representation. Therefore the A to Z helix transformation results in a unique numerical representation.

The following example demonstrates the numerical representations obtained by using the prior art ASCII method are not unique when compared with the numerical representations obtained using the A to Z helix transformation function of the present invention for two example dissimilar words Warned and Medium. It can be seen that the prior art method ASCII yields a similar numerical representation for the two example dissimilar words, whereas the A to Z helix transformation function of the present invention yields a unique numerical representation for each of the above two dissimilar words.

| Sl. No. | Word | Cumulative ASCII representation | A to Z helix representation |
|---|---|---|---|
| 1 | Warned | 449 | 7125419340 |
| 2 | Medium | 449 | 4077312590 |

In some embodiments, the analyzer 170 outputs the transformed unique numerical representations for use in text mining applications 180 such as automated email responses, automated text summarizations, unique keyword representations in any language, and/or intelligent communication devices.

The computer-implemented system 100 of the present invention includes various modules as described above, which can be implemented either in hardware or as one or more sequence steps carried out in a microprocessor, a microcontroller, or in an Application Specific Integrated Circuit (ASIC). It is understood that the various modules of the computer-implemented system 100 need not be separately embodied, but may be combined or otherwise implemented differently, such as in software and/or firmware.

Figure 2:
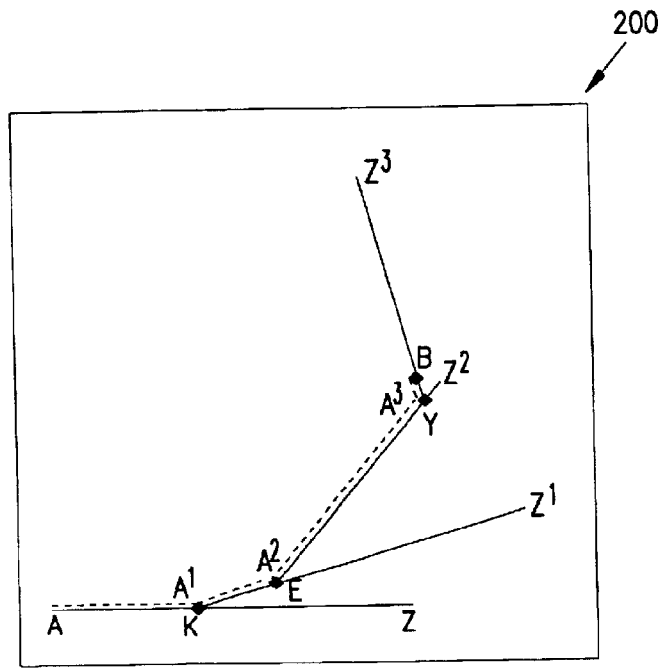
FIG. 2 illustrates a unique numerical representation in a helix graph.

FIG. 2 illustrates graphically 200 the principle of obtaining a unique numerical representation of a word using the A to Z helix transformation function. The helix graph 200 in FIG. 2 illustrates the principle by using the previously used example word KEYWORD in the helix graph 200. Where A to Z lines are formed using the beginning and extreme letters, respectively in the English language. The helix graph 200 is formed by using a new A to Z line (a new dimension) for each letter in the example word and projecting the position of each of the letters in the example word on to another new A to Z line (another new dimension) until all of the letters in the example word are projected. It can be seen from the helical graph 200 that the fourth or the fifth significant letter in the example key-word is more than sufficient to uniquely represent the word KEYBOARD using the helical graph 200.

Figure 3:
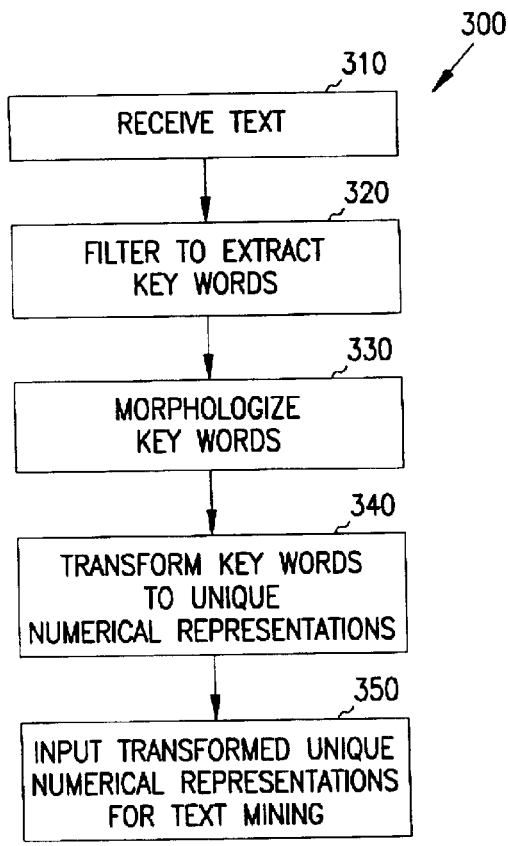
FIG. 3 illustrates overall operation of the embodiment shown in FIG. 1.

FIG. 3 illustrates an overview of one embodiment of the process 300 of the present invention. This process 300 provides, as illustrated in element 310, a computer-implemented system including a web server. The web server receives text including multiple words in a natural language from various sources such as a data base, a LAN/WAN network, the Internet, a voice recognition system, and/or mobile/fixed phone. Some embodiments allow the text to be in any natural language.

Element 320 filters the receive text to obtain one or more key-words. In some embodiments, the received text is filtered based on specific criteria such as filtering to remove all words that include less than or equal to three letters.

Element 330 morphologizes the filtered key-words for base formatting to improve the efficiency of processing the received text by the computer-implemented system for text mining applications. In some embodiments, the morphologizing includes classifying the filtered key-words according to similarities in fundamental characteristics of the filtered key-words.

Element 340 transforms the morphologized words to unique numerical representations for use in the text mining applications. In some embodiments, element 340 transforms the key-words to unique numerical representations. The process of transforming the morphologized words to unique numerical representations is described in detail with reference to FIGS. 1 and 2.

Element 350 includes inputting the transformed unique numerical representations for text mining applications such as data mining operations, automated email responses, automated text summarization's, unique keyword representations in any language, and/or intelligent communication devices.

CONCLUSION

The above-described computer-implemented technique provides a method and apparatus to transform multiple words in a text to unique numeric representations that can avoid overlapping of generated numbers, to provide flexibility and computational efficiency for various text mining applications.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A computer-implemented method for transforming words to unique numerical representations, comprising:
   receiving a text including multiple words; and
   transforming each of the received words into a unique numeral representation by using an A to Z helix transformation function such that the transformed unique numerical representation does not result in multiple similar numerical representations.

2. The method of claim 1, wherein receiving the text comprises:
   receiving the text from a source selected from the group consisting of a data base/data warehouse, a LAN/WAN network, the Internet, a voice recognition system, and a mobile/fixed phone.

3. The method of claim 1, further comprising:
   filtering the received words to extract one or more key-words; and
   morphologizing each of the filtered one or more key-words for base formatting based on similarities of fundamental characteristics in the one or more words.

4. The method of claim 3, wherein the filtering the received words to extract the key-words comprises:
   filtering the received words to extract one or more key-words based on a specific criteria selected from the group consisting of filtering to remove all words comprised of three or fewer letters, and filtering to remove rarely used words.

5. The method of claim 3, further comprising:
   inputting each of the transformed unique numerical representations for text mining applications.

6. A computer-implemented method for transforming words expressed in letters of an alphabet based language to unique numerical representations, comprising:
   receiving a text including multiple words; and
   transforming each of the received words into a unique numeral representation such that the transformed unique numerical representation does not result in multiple similar numerical representations, wherein each of the received words is transformed into the unique numerical representation using an A to Z helix transformation function, wherein the A to Z helix transformation function comprises:

$$(W) = \sum_{k=0}^{l} \{(\beta_{l-k})n^{l-k} + (l-k)\}$$

wherein W is a unique number obtained for a word having a length of l+1 letters, wherein the letters in the word W can be represented as $\beta_l \beta_{(l-1)} \beta_{(l-2)} \ldots \beta_0$, and also wherein $\beta_i$ represents the letter in the $i^{th}$ location of the alphabet in a particular language having n distinct letters in the alphabet of the language.

7. A computer-implemented system for transforming words in a text to unique numerical representations, comprising:
   a web server to receive the text including multiple words in a natural language;
   a key-word extractor to extract one or more key-words from the received words;
   a morphologizer to morphologize the extracted key-words based on similarities in fundamental characteristics of the extracted key-words; and
   an analyzer to transform each of the morphologized words to a unique numerical representation by using an A to Z helix transformation function such that the transformed unique numerical representation does not result in multiple similar numerical representations.

8. The system of claim 7, wherein the key-word extractor extracts key-words based on a specific criteria selected from the group consisting of filtering to remove all words including three or fewer letters in the received text, and filtering to remove rarely used words.

9. The system of claim 7, wherein the analyzer outputs the transformed words including unique numerical representations for use in text mining.

10. The system of claim 7, wherein the received text can be in any language.

11. A computer-implemented system for transforming words in a text expressed in letters of an alphabet based language to unique numerical representations, comprising:
   a web server to receive the text including multiple words in a natural language;
   a key-word extractor to extract one or more key-words from the received words;
   a morphologizer to morphologize the extracted key-words based on similarities in fundamental characteristics of the extracted key-words; and
   an analyzer to transform each of the morphologized words to a unique numerical representation such that the transformed unique numerical representation does not result in multiple similar numerical representations, wherein the analyzer transforms each of the morphologized words to a unique numerical representation using an A to Z helix transformation function, wherein the A to Z helix transformation function comprises:

$$(W) = \sum_{k=0}^{l} \{(\beta_{l-k})n^{l-k} + (l-k)\}$$

wherein W is a unique number obtained for a word having a length of l+1 letters, wherein the letters in the word W can be represented as $\beta_l \beta_{(l-1)} \beta_{(l-2)} \ldots \beta_0$, and also wherein $\beta_i$ represents the letter in the $i^{th}$ location of the alphabet in a particular language having n distinct letters in the alphabet of the language.

12. The method of claim 1, wherein transforming each of the received words to a unique numerical representation, further comprises:

using the A to Z helix transformation function, wherein the A to Z helix transformation function comprises:

$$(W) = \sum_{k=0}^{l} \{(\beta_{l-k})n^{l-k} + (l-k)\}$$

wherein W is a unique number obtained for a word having a length of l+1 letters, wherein the letters in the word W can be represented as $\beta_l \beta_{(l-1)} \beta_{(l-2)} \ldots \beta_0$, and also wherein $\beta_i$ represents the letter in the $i^{th}$ location of the alphabet in a particular language having n distinct letters in the alphabet of the language.

13. The system of claim 7, wherein the analyzer further transforms each of the morphologized words to a unique numerical representation using the A to Z helix transformation function, wherein the A to Z helix transformation function comprises:

$$(W) = \sum_{k=0}^{l} \{(\beta_{l-k})n^{l-k} + (l-k)\}$$

wherein W is a unique number obtained for a word having a length of l+1 letters, wherein the letters in the word W can be represented as $\beta_l \beta_{(l-1)} \beta_{(l-2)} \ldots \beta_0$, and also wherein $\beta_i$ represents the letter in the $i^{th}$ location of the alphabet in a particular language having n distinct letters in the alphabet of the language.

* * * * *